Oct. 31, 1967  W. H. MOORE ETAL  3,349,831
PROCESS OF PRODUCING A CAST MEMBER HAVING
A VARYING GRAPHITE STRUCTURE
Filed Jan. 22, 1965  2 Sheets-Sheet 1

INVENTORS
WILLIAM H. MOORE
CHARLES A. GREEN
BY

Oct. 31, 1967  W. H. MOORE ETAL  3,349,831
PROCESS OF PRODUCING A CAST MEMBER HAVING
A VARYING GRAPHITE STRUCTURE
Filed Jan. 22, 1965  2 Sheets-Sheet 2

INVENTORS
WILLIAM H. MOORE
CHARLES A. GREEN
BY
Woodling Krost Granger + Rust
attys

United States Patent Office 3,349,831
Patented Oct. 31, 1967

3,349,831
PROCESS OF PRODUCING A CAST MEMBER HAVING A VARYING GRAPHITE STRUCTURE
William H. Moore, Meadow Lane, Purchase, N.Y. 10577, and Charles A. Green, R.R. 3, Godfrey, Ill. 62035
Filed Jan. 22, 1965, Ser. No. 427,377
2 Claims. (Cl. 164—58)

ABSTRACT OF THE DISCLOSURE

The process of making a glass mold by selecting an appropriate foundry mold shape with a chiller located at a position corresponding to the working face of the glass mold. Preparing a molten bath of cast iron of a given chill value and adding to the bath a nodularizing agent in amount to increase the chill value from 10 to 75% and then casting the so treated bath into the mold shape. This results in a glass mold with a face of cast iron with the graphite in the nodular form, a next layer of undercooled graphite and a next layer of flake graphite.

---

Our invention relates to castings for heat resistance, in general, and more particularly, to a casting of composite metallurgical structure for use as a glass or bottle mold.

Generally, heat resistant castings, particularly glass or bottle molds, plungers, or neck rings, are cast from soft cast iron noted for its relatively high thermal conductivity and its ability to withstand shock heat conditions in service, without surface spalling, cracking or alligatoring.

Unfortunately, a soft cast iron such as conventionally employed for this purpose, has a low surface density quite unsuitable to produce the type of machined surface required for a good finish or smooth surface on the glassware. Common practice is to densify the working surface of glass molds and casings of this nature, by means of casting against metal chills. Such chilling produces a carbidic structure containing fine undercooled graphite, which is capable (after annealing) of being machined to the required accuracy and intimacy of detail. Thus, a glass or bottle mold, as normally used by the art, comprises a chilled structure at the cast surface to be used as the mold surface, a layer of fine, undercooled graphite immediately away from the working surface, and coarse flake graphite particles further away from the working surface. This seems to represent the best compromise between surface density, heat conductivity, and ability of the mold to resist spalling or disintegration under the effect of heat.

Some attempts have been made to utilize gray cast iron containing graphite in the nodular form for glass molds and the like. This nodular iron has the advantage of high surface density, and relative freedom from surface oxidation, when subject to the service conditions attendant with the casting and forming of glass objects. On the other hand, nodular graphite iron molds have an extremely poor thermal conductivity, which makes it unsuitable for general use in this type of service.

We have invented a method of combining inherent advantages of nodular graphite irons, with those of flake graphite irons, in such a way, that we have been able to produce a vastly improved glass or bottle mold.

An object of this invention is a glass mold having improved heat resistance.

A further object is a glass mold having an improved, more dense working surface.

A further object is a glass mold having a surface of improved machinability, allowing the free cutting of intricate shapes.

A further object is a glass mold exhibiting improved service life.

Figure 1:
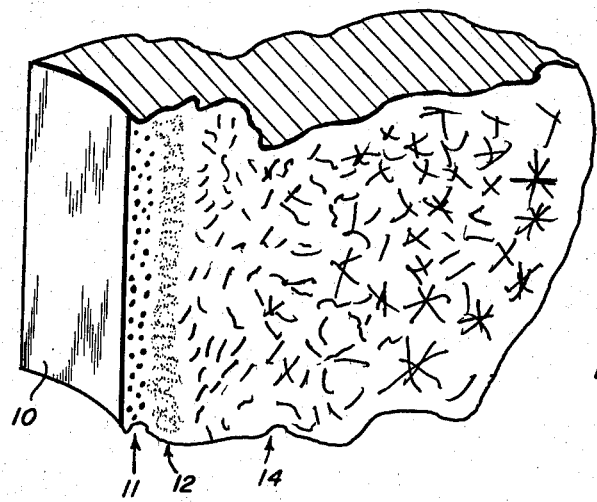
Figure 2:
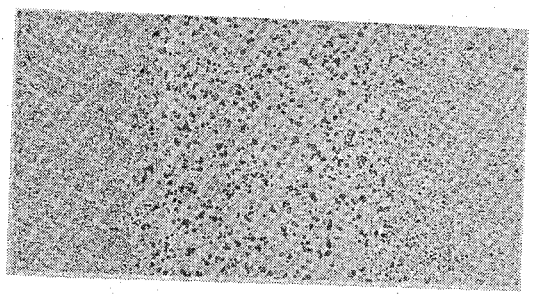
Figure 3:
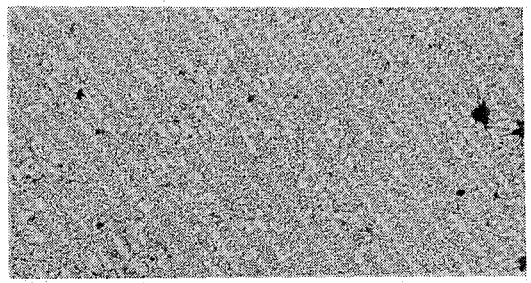
Figure 4:
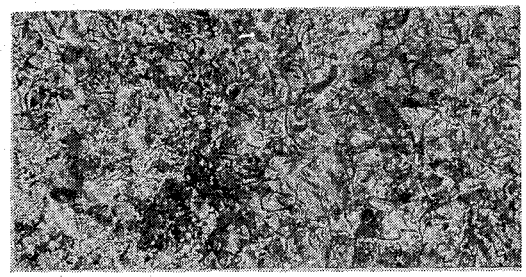

Other objects of this invention which include the method of producing a glass mold having the above referred to advantages, will be apparent on the reading of the specification and drawings, in which:

FIGURE 1 is a typical cross-section of the glass mold of our invention, showing a metallurgical structure comprising a chilled face 10, nodular graphite in a zone 11 described as the working surface, undercooled graphite in the zone 12 adjacent to the working surface, and coarse flake graphite at a zone 14 removed from the working surface;

FIGURES 2, 3, and 4 are photographs which illustrate the nature of the graphite in the zones thus described and have been taken from a typical glass mold casting of this invention. All photographs are unetched and at a magnification of 100 diameters.

The unique structure of the glass mold of this invention is made possible by the use of chillers, as commonly practiced by the art, and the casting of a metal which has been nodularized, in partial degree. The method of doing this is clearly outlined in the specification and the examples given.

The advantages of the structure shown in the drawings are immediately apparent. The surface or working surface, containing graphite in the nodular form, is high in density, is easily machinable, is high in strength, and has an excellent heat resistance, in that it is less susceptible to surface oxidation and surface cracking or crazing, which leads to surface breakdown.

This zone, containing nodular graphite, is usually controlled to a depth of from one-sixteenth to one-quarter of an inch for optimum results.

Because of the inherently poorer thermal conductivity of a metal containing nodular graphite, an excessive thickness of the nodular graphite layer would lead to surface breakdown and cracking, due to the inability of the heat to flow away through the body of the glass mold.

While we do not wish to limit ourselves to a definite thickness, as this is somewhat related to the design and configuration of the mold, we have found that the preferred thickness of the nodular layer is between the above limits, after the surface has been machined to its desired configuration.

The layer of undercooled graphite immediately behind the nodular graphite is more or less conventional for gray cast irons which have been chilled, but in glass mold castings this layer has the advantage of having a good thermal conductivity and yet, of being reasonably dense.

This undercooled graphite has a better thermal conductivity than carbides or nodular graphite, but does not have quite as good a thermal conductivity as coarse flake graphite. We, therefore, prefer to keep this zone at a depth ranging from one-sixteenth to one-half of an inch.

In the preferred structure of the glass mold of this invention, this undercooled graphite is, nevertheless, present, because of the metallurgical phenomena associated with chilling. As it does not constitute a disadvantage in the structure and, in fact, is claimed by many skilled in the art to impart good heat resistant properties, we prefer to have it present in the product of our invention.

Behind this layer of undercooled graphite there exists a region of the mold which contains coarse flake graphite. As graphite has a high thermal conductivity, we prefer to have these graphite flakes both numerous and large, so that the mold may properly perform its function of dissipating the heat absorbed at the glass/metal interface.

The structure of the glass mold of our invention is unique, in that the nodular graphite is confined to the working surface of the mold and does not extend sufficiently far inwards to create the problems normally found in glass molds having a nodular structure throughout the section. On the other hand, as the graphitic coarse flake graphite is confined to the section of the mold away from the working face, the problems presented by having this type of graphite at the mold surface, are also avoided. The flake graphite in the mold of our invention tends to be slightly compacted in form and, because of nucleation effect attendant with the production of the nodular form at the surface, has exceptional uniformity of distribution.

Coarse flake graphite at the mold surface tends to allow oxygen to penetrate into the metal, which, in itself, lowers the thermal conductivity to a marked degree and eventually causes physical failure of this surface. Further than this, coarse graphite at the surface would not allow the intricate detail in machining, which is necessary in many glass molds.

While it is relatively easy to cast a glass mold with all of the graphite in the nodular form, or with all of the graphite in the flake form, a composite structure, such as is obtained in the product of our invention requires certain very well defined procedures, such as: selection of the nodularizing agents used for producing this structure and strict control of the degree of chill associated with the nodularization procedure.

While any nodularizing agent, such as: magnesium, cerium, yttrium, lanthanum, and neodymium, etc., may be used for producing the nodular graphite mold of this invention, we prefer to use rare earths or combinations of rare earths, such as cerium and neodymium, because the nodularization of graphite with these agents is somewhat less complete and, therefore, makes it easier to obtain the exact structure we require in the product of this invention.

The chiller used at the working surface of the glass mold may consist of an iron or steel casting or may consist of any body capable of withdrawing heat rapidly from the surface of the glass mold, when it is cast. This is common practice to those skilled in the art and the use of a chiller or of accelerated cooling at the surface of the glass mold is necessary to produce the unique structure of this invention.

Obtaining the desired structure is largely a matter of producing a degree of nodularity in the melt which, under slow cooling, would produce the flake type of graphite and which, under more rapid cooling, such as is present at the chilled surface, would produce the nodular type of graphite.

An additional advantage of such chilling is that the nodular graphite produced is extremely small, thereby presenting a working surface of high density to the product. Production variables would often allow the formation of some free carbide at the chilled surface. As this is considered detrimental, from the standpoint of machining, in particular, any carbides, so formed, could be removed by a standard annealing practice, such as employed by those skilled in the art. Such annealing of a white iron which has been nodularized, will, of course, produce the desired nodular graphite at the surface and would considerably improve both machining qualities and heat resistance.

Such annealing, also, will improve thermal conductivity throughout the mold, by producing a ferritic matrix. While a ferritic matrix is preferred in this product, it is possible to produce glass molds of good quality utilizing a pearlitic matrix. Normally, this pearlitic matrix could be obtained by suitable alloy addition utilizing alloys such as chromium, molybdenum, vanadium, copper, and the like. The more desired ferritic matrix, having a higher thermal conductivity and an easier machinability, is produced by proper adjustment of the silicon content of the metal and/or by an annealing of the finished casting, prior to machining.

Alloys such as nickel, copper, and aluminum, used by many in the glass mold industry, may also be utilized in the product of this invention, as they have virtually no effect on the composite structure of nodular, undercooled, and flake graphite desired in the end product.

Attainment of the desired structure is best achieved by close control on the nodularizing procedure, as related to the section or mass of the casting to be poured. Normally, in glass mold practice, it is conventional to use a metal chiller, to form the working face of the glass mold. The chilling charatceristics of the metal from which the mold is cast are often gauged to suit the heat extraction capabilities of the chiller.

The attainment of nodular graphite at the surface, where cooling is more rapid, and flake graphite at the back, where cooling is slower, is made possible by utilizing the carbide stabilizing tendencies of various nodularizing agents. Thus, when a nodularizing agent, such as magnesium or cerium, is added to the melt, it will increase the chilling value of this melt, when once it has neutralized sulphurs, and other interfering elements and has started to promote nodularization. If this degree of chilling by the nodularizing agent is controlled to where it is not excessive, but to the point where it is still effective in promoting nodularization, then it is possible to produce a casting having the composite structure exhibited by the product of this invention.

As the base metal used for the production of nodular iron may vary somewhat in its initial chill value, according to the type of charge used for producing the metal bath or according to the type of furnace used for melting the metal, all control procedures used in making the produce of this invention relate to the initial chill value of the molten bath. This chill value may be conveniently measured by means of a chill test, such as a rectangular bar cast on a metal chill or by means of a wedge test such as commonly used by those skilled in the art.

In producing our preferred glass mold, we like to start with a molten metal having a relatively low chill value. This assures us of a high graphitic carbon content in the product and also of overall control of the nodularizing procedure. We then add a nodularizing agent such as magnesium or cerium, in any convenient form, to the molten bath, so that the chill value is increased by at least ten percent, but by not more than seventy-five percent. It has been established by those skilled in the art, that a chill value of 100% of the section involved is necessary to produce a completely nodular structure.

The procedure, therefore, actually involves two steps— firstly, preparing a molten bath and evaluating its chill value by any convenient standard; secondly, adding a nodularizing agent, so as to increase this chill value by ten percent, but not more than 75 percent of its original value. This is far below the 100% chill that would be required for a completely nodular structure.

The metal, thus treated with nodularizing agent, is cast in a suitable mold containing a chiller and we would normally not resort to graphitizing after adding the nodularizing agent, as would conventionally be practiced in the production of nodular graphitic cast iron.

It is important not to allow the chill value during nodularization to increase too far, otherwise a glass mold having a nodular structure throughout, would result. On the other hand, if there was no increase at all in chill value during nodularization, no nodular graphite at the surface of the glass mold, against the chiller, would result.

Where graphitization is utilized, we prefer to do this prior to the nodularization procedure; thus, we might add silicon or calcium silicide, or any such graphitizing agent, to the original melt, so as to reduce the chill value and even out production and melting variables. When once this chill value had been established, we would then add the nodularizing agents, so as to increase it and provide the necessary degree of nodularization in the melt. We find that the nodular layer resulting from our process may not always occur immediately at the chill surface, quite often it may be about 1/8" away from the surface. This is of little importance because after the machining operation, the desired nodular layer will then occur at the surface of the glass mold.

The following examples clearly indicate the method used for producing the improved glass mold of this invention:

A glass mold pattern was obtained and several molds were prepared with a chiller on the working surface. The mold metal section ranged from one and one-half to two and one-half inches thick and the chiller thickness was one-half inch.

A melt was prepared in an induction furnace having the following composition:

|  | Percent |
|---|---|
| Total carbon | 3.73 |
| Silicon | 1.80 |
| Manganese | 0.32 |
| Sulphur | 0.03 |
| Phosphorous | 0.07 |

This melt, when tested in a standard 28½° wedge with a one-half inch back, showed a chill value of 8/32", this being the width of the wedge at the line of demarcation between the white and the gray portion of the test wedge. An addition of ferro silicon amounting to one-quarter percent by weight of the bath, reduced this chill value to 4/32".

An addition of mischmetal amounting to one-quarter percent by weight of the bath was made and a portion of the melt was cast into a test wedge, which was fractured. The chill value on this test wedge was found to be 4/32". A further addition of one-eighth percent by weight of mischmetal was made to the bath and another test wedge was cast and broken. The chill value was found to be 9/32", which was fifty percent higher than the chill value shown by the original bath. The metal was cast into the glass molds. One of these molds was cut up for examination of the structure under the microscope.

The chilled surface of the mold was found to be a structure of fifty percent pearlite and fifty percent ferrite, with the graphite substantially in the nodular form, to a depth of 5/16" from the chilled surface. At this point the structure was found to be substantially ferritic with the graphite in the undercooled form to a depth of 7/16" from the chilled face. Beyond 7/16" from the chilled face, the graphite was found to comprise massive random flakes in a matrix of fifty percent ferrite and fifty percent pearlite.

The remaining mold castings were annealed to produce a fully ferritic matrix and were placed in service after machining the working surfaces. This machining was approximately 1/8" deep.

It was found that these molds performed excellently in service, producing thirty-five percent more glass containers than the average obtained with conventional gray cast iron molds. The surface appearance of the glass containers was excellent and no problem was experienced with sticking or with microcrazing of the mold surface.

We have also produced the glass molds of this invention by using magnesium silicon as a nodularizing agent and have had equally good results. In all cases, sufficient magnesium silicon was added to the bath to increase its chill value by ten to seventy-five percent over what it was before the addition.

The structure of the glass molds at the chiller surface is not always completely nodular and, in some cases, the graphite occurs as a mixture of nodules and compacted lumps, with a proportion of undercooled graphite. In general, however, the amount of nodular graphite at the surface ranges from fifty to one hundred percent of the whole, with substantially no conventional flake graphite being present for a distance of at least 3/32" from the chilled surface and no nodular graphite being present at a distance of one inch from the chilled surface.

This invention has been described with a certain degree of particularity in its preferred form, but it should be understood that the present disclosure of the preferred form has been made only by way of example and that numerous changes in the details of construction and operation may be made, without departing from the spirit and the scope of the invention as hereinafter claimed.

What is claimed is:

1. The process of producing a glass mold for receiving molten glass and producing a shape from the same, comprising the steps of providing a foundry mold having a chiller located at a position corresponding to the working face of the glass mold, providing a molten bath of cast iron having a given chill value as measured by a standard chill test, adding to said bath of cast iron a nodularizing agent in amount sufficient to increase said chill value from 10 to 75%, and thereafter casting said bath of cast iron to form an iron casting having a first layer comprising graphite in the nodular form, a second layer adjacent said first layer comprising undercooled graphite, and a third layer adjacent said second layer comprising flake graphite.

2. The process of producing a metal member for receiving molten glass and producing a shape from the same, comprising the steps of providing a foundry mold having a chiller at a working surface of the metal member, providing a molten bath of cast iron having a given chill value as measured by a standard chill test, adding to said bath of cast iron a nodularizing agent in amount sufficient to increase said chill value from 10 to 75%, and thereafter casting said bath of cast iron to form an iron casting having a first layer comprising graphite in the nodular form, a second layer adjacent said first layer comprising undercooled graphite, and a third layer adjacent said second layer comprising flake graphite.

References Cited

UNITED STATES PATENTS

| 2,281,460 | 4/1942 | Smalley | 295—30 |
| 2,352,237 | 6/1944 | Vial | 295—30 |
| 3,274,652 | 9/1966 | Banks | 249—135 X |

FOREIGN PATENTS

| 249,538 | 2/1964 | Australia. |
| 935,016 | 8/1963 | Great Britain. |

J. SPENCER OVERHOLSER, *Primary Examiner.*

E. MAR, *Assistant Examiner.*